Sept. 9, 1924.
KALMAN VON KANDO
ROTARY ELECTRIC MACHINE
Filed Sept. 17, 1920
1,507,606
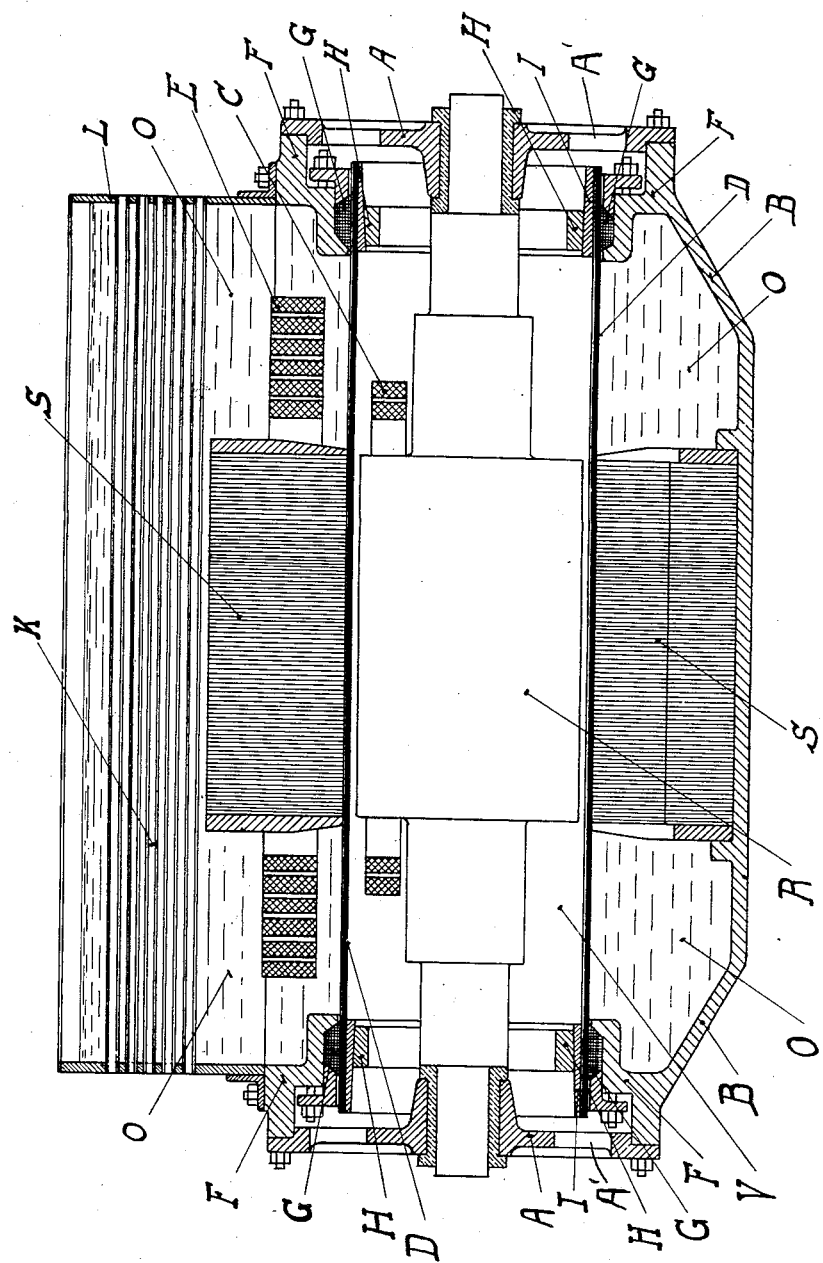
Inventor:
Kálmán von Kandó,
by Emery, Booth, Janney + Varney
Attys.

Patented Sept. 9, 1924.

1,507,606

UNITED STATES PATENT OFFICE.

KALMAN v. KANDO, OF BUDAPEST, HUNGARY.

ROTARY ELECTRIC MACHINE.

Application filed September 17, 1920. Serial No. 411,017.

*To all whom it may concern:*

Be it known that I, KALMAN VON KANDO, a citizen of Hungary, residing at Budapest, in the Kingdom of Hungary, have invented certain new and useful Improvements in Rotary Electric Machines, for which I have filed applications in Hungary June 10, 1918; Germany, June 17, 1918; Austria, November 25, 1919; and Italy, January 15, 1920, and of which the following is a specification.

This invention relates to improvements in machines and particularly electrical machines.

It is well known that by immersing high voltage windings for instance transformers in an oil bath, the security of insulation is enhanced and the cooling rendered more effective.

With rotary electric machines the immersion in oil is rendered difficult because of the fact that the rotor of the machine revolving at high speed would cause whirls in the oil and friction losses so that the use of oil-insulation in such devices is practically impossible. Hence its use has been limited to machines developing only moderate voltages and the high voltages have been produced by the use of oil-transformers.

The object of my invention is to provide means for use on alternating current rotary machines allowing to impress to or to generate by such machines directly voltages of a height requiring an oil insulation whereby in many instances the use of transformers can be avoided.

According to my invention I provide an oil tight partition between the space containing the high-voltage wound stator and the space receiving the low-voltage wound rotor of the alternating current machine, said partition forming with the adjacent parts of the stator casing an oil-chamber enclosing the high-voltage stator-winding and forming an encircling mantle around the rotor.

The channel formed by the partition separating the stator-space from the rotor-space extends preferably throughout the length of the stator-space forming an oil-chamber of somewhat larger diameter than the rotor, thereby allowing the removal and replacement of the rotor without dismantling the oil-chamber, while on the other hand the partition may be removed without complete removal of the rotor, by suitably supporting the rotor for instance by means of a detachable extension of the motor-shaft that provides for the support of the rotor outside of the machine.

Referring to the annexed drawing showing a diagrammatic longitudinal section of a machine, the windings being shown for the sake of convenience only at the upper part of the stator and rotor, S is the stator, E its high voltage winding to be immersed in oil, R the rotor and C its low-voltage winding.

According to my invention the space O containing the high-voltage stator-winding E is separated from the rotor-space V by means of a partition D of an insulating material such, for example, as bakelized paper that is capable of resisting the action and pressure of the oil. The stator-space O forms, together with the casing B of the machine, an oil-chamber encircling, like a mantle, the rotor-space V.

As shown in the drawing, the partition D is a cylindrical tube extending axially through the machine-casing and covering the inner pole-surface of the stator-iron and possessing an inner diameter large enough to allow the rotor to revolve freely.

G, G are stuffing boxes in the end-shields F of the casing forming tight connections with both ends of the tube D. The beveled rings I and H in the interior of the tube D support the tube against the pressure of the packing of the stuffing-boxes G. The outer rings are preferably fastened to the tube D.

The rotor is supported in detachable coverplates A having the openings A'. After removal of one coverplate A and of the inner beveled ring H the rotor may be removed, since the inner diameter of the outer beveled ring I is large enough to let the rotor pass.

The stator space O is filled with oil, so that the high-voltage stator-winding is immersed in oil, while the low-voltage wound rotor revolves in air.

It is advisable to provide the oil chamber with a superstructure or extension L containing cooling tubes through which a cooling medium may circulate.

I do not limit the scope of my invention to the construction shown in the drawing and described with reference thereto for obviously the constructional details may be varied. It is for instance not necessary to extend the partition D upon the inner pole-surface of the stator if the slots are closed oil-tightly and the lamellæ of the stator are cemented together by an oil-tight cement.

Although my invention is herein shown applied to alternating current machines, it may be used on direct current rotary machines.

What I claim is:

1. In an electrical device, a rotor, a stator, a shell enclosing the stator with its windings, a cylindrical tube of larger diameter than the rotor, passing through the air-gap between the stator and the rotor and extending through the field-bore of the stator, openings in the end walls of the stator-shell of larger diameter than said cylindrical tube and a detachable fluid-tight connection between said cylindrical tube and each wall of the stator-shell.

2. In an electrical device, a rotor, a stator, a shell enclosing the stator with its windings, a cylindrical tube of larger diameter than the rotor, passing through the air-gap between the stator and the rotor and extending through the field-bore of the stator, openings in the end walls of the stator shell of larger diameter than said cylindrical tube and stuffing boxes in the openings of the stator-shell to form a fluid-tight joint with the said cylindrical tube.

3. In an electrical device, a rotor, a stator, a shell enclosing the stator with its windings, a cylindrical tube of larger diameter than the rotor, passing through the air-gap between the stator and the rotor and extending through the field-bore of the stator, openings in the end walls of the stator-shell of larger diameter than said cylindrical tube, stuffing boxes in the openings of the stator-casing to form a fluid-tight joint with the said cylindrical tube and coverplates supporting the bearings for the rotor detachably secured to the stator-shell.

4. In an electrical device, a rotor, a stator, a shell enclosing the stator with its windings, a cylindrical tube of larger diameter than the rotor, passing through the air-gap between the stator and the rotor and extending through the field-bore of the stator, openings in the end walls of the stator-shell of larger diameter than said cylindrical tube, stuffing boxes in the openings of the stator-shell to form a fluid-tight joint with the said cylindrical tube and expansion rings within said cylindrical tube opposite to the stuffing boxes.

5. In an electrical device, a rotor, a stator, a shell enclosing the stator with its windings, a cylindrical tube of larger diameter than the rotor passing through the air-gap between the stator and the rotor and extending through the field-bore of the stator, openings in the end walls of the stator-shell of larger diameter than said cylindrical tube, stuffing boxes in the openings of the stator-shell to form a fluid-tight joint with the said cylindrical tube, supporting rings with cylindrical outer surface and beveled inner surface within said cylindrical tube, opposite to the stuffing boxes and expansion rings within the said supporting rings beveled at their outer surface to fit the inner beveled surface of said supporting rings.

In testimony whereof I affix my signature in presence of two witnesses.

KALMAN v. KANDO.

Witnesses:
S. B. VAUGHAN,
EUG. HARRANY.